US009215206B2

(12) United States Patent
Subramanian

(10) Patent No.: US 9,215,206 B2

(45) **Date of Patent: *Dec. 15, 2015**

(54) SUBNET PRIORITIZATION FOR IP ADDRESS ALLOCATION FROM A DHCP SERVER

(71) Applicant: Alcatel-Lucent, Boulogne Billancourt (FR)

(72) Inventor: Ramaswamy Subramanian, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,376

(22) Filed: Aug. 20, 2014

(65) Prior Publication Data

US 2014/0359136 A1 Dec. 4, 2014

Related U.S. Application Data

(63) Continuation of application No. 13/535,966, filed on Jun. 28, 2012, now Pat. No. 8,856,296.

(51) Int. Cl.
*H04L 29/12* (2006.01)

(52) U.S. Cl.
CPC ........ *H04L 61/2007* (2013.01); *H04L 61/2015* (2013.01); *H04L 61/2061* (2013.01); *H04L 61/6068* (2013.01)

(58) Field of Classification Search
CPC ........................ H04L 61/2007; H04L 61/2015
USPC .......................................................... 709/226
See application file for complete search history.

(56) References Cited

U.S. PATENT DOCUMENTS

| | | | |
|---|---|---|---|
| 2,003 A | 3/1841 | Van Osdel | |
| 6,957,276 B1 | 10/2005 | Bahl | |
| 7,231,660 B1 | 6/2007 | Daude et al. | |
| 7,409,432 B1 | 8/2008 | Recio et al. | |
| 7,788,345 B1 | 8/2010 | Sukiman et al. | |
| 8,868,784 B2 * | 10/2014 | Subramanian | 709/245 |
| 2002/0065906 A1 | 5/2002 | Davidson et al. | |
| 2002/0133573 A1 | 9/2002 | Matsuda et al. | |
| 2003/0005096 A1 | 1/2003 | Paul et al. | |
| 2003/0010243 A1 | 1/2003 | Roller | |
| 2004/0052216 A1 | 3/2004 | Roh | |
| 2004/0218558 A1 | 11/2004 | Johansson | |
| 2004/0250117 A1 | 12/2004 | Congdon | |
| 2005/0251856 A1 | 11/2005 | Araujo et al. | |

(Continued)

FOREIGN PATENT DOCUMENTS

| | | |
|---|---|---|
| WO | 02091682 A1 | 11/2002 |
| WO | 03067853 A2 | 8/2003 |

*Primary Examiner* — Kostas Katsikis

(74) *Attorney, Agent, or Firm* — Kramer & Amado, P.C.

(57) ABSTRACT

A method, apparatus, and machine readable storage medium is disclosed for handling Dynamic Host Configuration Protocol (DHCP) at a first DHCP server. The method may include receiving, via a configuration file at the first DHCP server, a priority for each of a plurality of subnets; assigning the priority to each of the plurality of subnets; receiving a DHCP Discover message from a client; in response to receipt of a DHCP Discover message from a client, selecting a subnet having a highest priority from said plurality of subnets; selecting an Internet Protocol (IP) address from said selected subnet having a highest priority; and transmitting a DHCP Offer message to said client, offering said selected IP address.

15 Claims, 5 Drawing Sheets

(56) References Cited

U.S. PATENT DOCUMENTS

| | | | |
|---|---|---|---|
| 2005/0271049 | A1 | 12/2005 | Jain et al. |
| 2005/0286518 | A1 | 12/2005 | Park et al. |
| 2006/0077926 | A1 | 4/2006 | Rune |
| 2006/0155563 | A1 | 7/2006 | Banerjee et al. |
| 2006/0161661 | A1 | 7/2006 | Johnson et al. |
| 2006/0161663 | A1 | 7/2006 | Palm |
| 2006/0198320 | A1 | 9/2006 | Hsu et al. |
| 2007/0286210 | A1 | 12/2007 | Gutt et al. |
| 2008/0101353 | A1 | 5/2008 | Streijl et al. |
| 2009/0210518 | A1 | 8/2009 | Verma et al. |
| 2010/0309847 | A1 | 12/2010 | Bharadwaj |
| 2011/0225284 | A1 | 9/2011 | Savolainen |
| 2013/0110824 | A1 | 5/2013 | Derose et al. |
| 2013/0166748 | A1 | 6/2013 | Christenson et al. |
| 2013/0182712 | A1 | 7/2013 | Aguayo et al. |
| 2014/0006568 | A1* | 1/2014 | Subramanian ................ 709/220 |

* cited by examiner

SUBNET PRIORITIZATION FOR IP ADDRESS ALLOCATION FROM A DHCP SERVER

CROSS-REFERENCE TO RELATED APPLICATIONS

This application is a continuation of U.S. Ser. No. 13/535,966 filed on Jun. 28, 2012, the entire disclosure of which is hereby incorporated herein for all purposes.

The present application is related to co-pending U.S. patent application Ser. No. 13/535,693 entitled "Prioritization Based On IP Pool and Subnet by DHCP" (Subramanian), filed on Jun. 28, 2012 and filed concurrently herewith, the entire content of which is incorporated herein by reference.

The present application is related to co-pending U.S. patent application Ser. No. 13/535,783 entitled "Sticky IP Prioritization Based On IP Pool and Subnet by DHCP" (Subramanian), filed on Jun. 28, 2012 and filed concurrently herewith, the entire content of which is incorporated herein by reference.

FIELD OF INVENTION

The invention is directed to Internet Protocol (IP) address assignment and more specifically, improved Dynamic Host Configuration Protocol (DHCP) server functionality.

BACKGROUND

Dynamic Host Configuration Protocol (DHCP) is a network protocol for enabling a server to assign and manage IP addresses for computers (or clients or hosts) connected to an Internet Protocol (IP) network. Typically a DHCP server assigns IP addresses from a defined range of numbers often referred to as a scope or IP address pool, which can span multiple subnets. Multiple IP Address ranges from the various subnets can be assigned to the DHCP server for allocation to clients. When a DHCP server receives a request from a client for an IP Address, the DHCP server randomly selects a free IP address from the various subnets available and allocates that IP Address to the client. As the IP Addresses are randomly selected, there is no way of determining the order in which subnets would be exhausted. Therefore, improvement to methods for DHCP servers to allocate IP addresses is highly desirable.

SUMMARY

Embodiments of the invention provide a method for handling Dynamic Host Configuration Protocol (DHCP) at a first DHCP server. The method comprises steps of: assigning a priority to each of a plurality of subnets; receiving a DHCP Discover message from a client; in response to receipt of a DHCP Discover message from a client, selecting a subnet having a highest priority from the plurality of subnets; selecting an Internet Protocol (IP) address from the selected subnet having a highest priority; and transmitting a DHCP Offer message to the client, offering the selected IP address.

In some embodiments the assigning a priority comprises receiving input from an operator.

In some embodiments the assigning a priority comprises receiving input from a configuration file.

Some embodiments further comprise steps of identifying at the first DHCP server, fully used subnets; partially used subnets; and unused subnets; first migrating unused subnets from the first DHCP server to a second DHCP server; migrating fully used subnets from the first DHCP server to the second DHCP server; and then migrating partially used subnets from the first DHCP server to the second DHCP server.

Other embodiments of the invention provide a DHCP server, comprising: a processor; and a memory communicatively connected to the processor, the memory having stored thereon instructions which, when executed by the processor, cause the processor to: assign a priority to each of a plurality of subnets; receive a DHCP Discover message from a client; select a subnet having a highest priority from the plurality of subnets; select an Internet Protocol (IP) address from the selected subnet having a highest priority; and transmit a DHCP Offer message to the client, offering the selected IP address.

Other embodiments of the invention provide a program storage device readable by a machine, tangibly embodying a program of instructions executable by the machine to perform the steps of: assigning a priority to each of a plurality of subnets; receiving a DHCP Discover message from a client; selecting a subnet having a highest priority from the plurality of subnets; selecting an Internet Protocol (IP) address from the selected subnet having a highest priority; and transmitting a DHCP Offer message to the client, offering the selected IP address.

BRIEF DESCRIPTION OF THE FIGURES

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Figure 1:
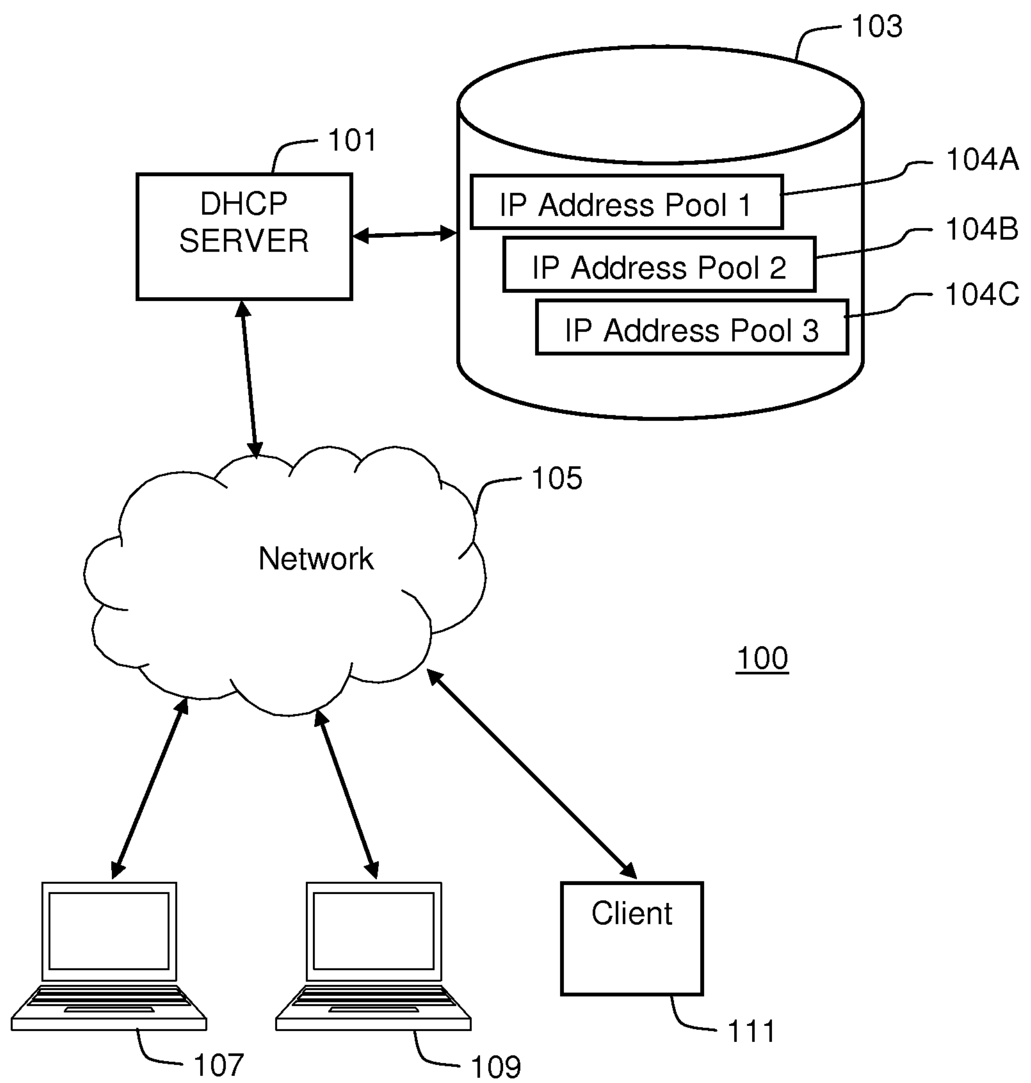
FIG. 1 is a schematic block diagram of a DHCP server in an IP network.

Referring now to the drawings, in which like numerals refer to like components or steps, there are disclosed broad aspects of various exemplary embodiments.

FIG. 1 is a schematic block diagram of a DHCP server 101 in an IP network 105. DHCP server 101 is in communication with a database 103 having one or more IP address pools 104A, 104B, 104C which contain IP addresses assigned to DHCP server 101 for allocation to a client 107, 109, 111 etc., in response to a request for an IP address via a DHCP Discover message from a client. A client can be any device which accepts IP address from a DHCP Server, such as a computer, residential gateway, modem, etc. The database 103 can be physically incorporated within DHCP server 101 or can be physically separate and can comprise data memory such as a tangible, non-transitory computer readable storage medium, for example magnetic or optical drive or diskette, semiconductor memory and the like as is well known in the art. Database 103 can contain multiple IP address pools 104A, 104B, 104C to accommodate multiple network groupings. DHCP server 101 can for example handle IP address allocation for multiple customers, each having a dedicated IP address pool. Additionally an IP address pool can be associated with a physical grouping such clients located within a specific city or suburb and connected to DHCP server 101 via gateway router having a gateway interface address (gi-addr).

Figure 2:
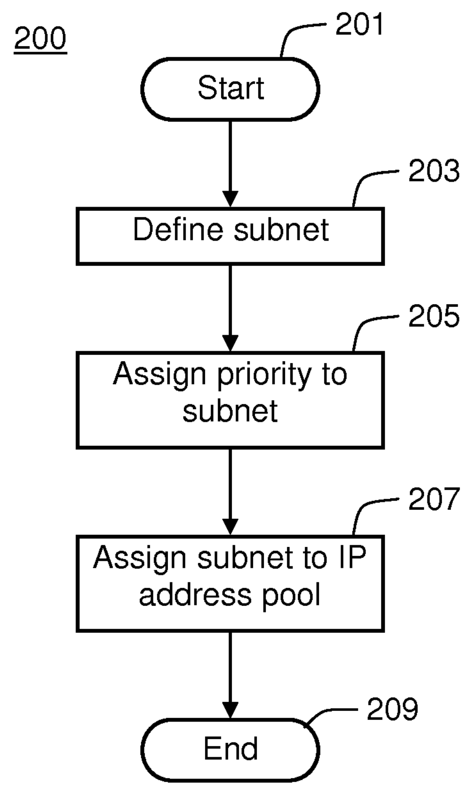
FIG. 2 is a flow chart illustrating assigning a priority to a subnet.

FIG. 2 is a flow chart illustrating assigning a priority to a subnet. The functionality of the DHCP server is enhanced by assigning a priority to each subnet when each subnet is defined for the DHCP server 101. The process starts at step 201 and can comprise a sequence of steps executed by the DHCP server which can accept input from an operator via a graphical user interface (GUI) or via a configuration file which controls the behavior of the DHCP server. At step 203 a subnet is specified with a label, an IP address range, including a starting IP address and an ending IP address, a subnet mask, and other parameters as is well known in the art. At step 205, a priority is assigned to the subnet being defined. At step 207 the subnet being defined is assigned to an IP address pool associated with the DHCP server 101. The process ends at step 209. Having a priority associated with each subnet allows he DHCP server 101 to select a subnet from which to select available IP addresses for allocation to clients in a deterministic fashion. Operators can have control over the order in which subnets can be used first to select IP addresses from.

Figure 3:
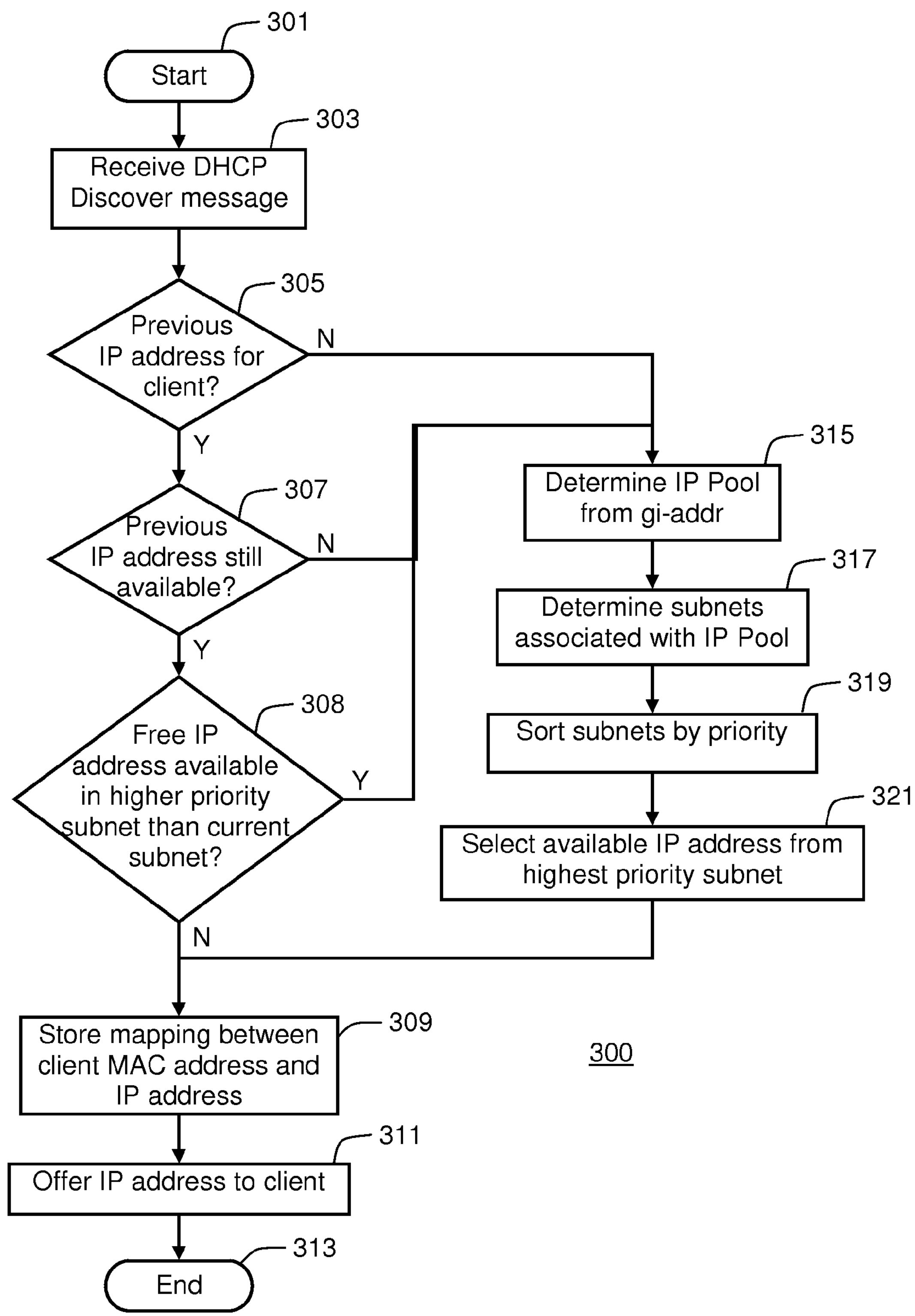
FIG. 3 is a flow chart illustrating assigning an IP address using subnet priority.

Various enhancements to DHCP server 101 are described with respect to FIG. 3 which is a flow chart illustrating assigning an IP address to a client 107 (or 109 or 111) using subnet priority. The process starts at step 301. At step 303, DHCP server 101 receives a DHCP Discover message from client 107 requesting an IP address. At step 305 DHCP server 101 determines if the client 107 previously had an IP address assigned to it by comparing the hardware Media Access Control (MAC) address of client 107 to MAC addresses previously associated with an IP address stored in the IP address pools 104A, 104B, 104C. If yes, the process continues to step 307 where DHCP server 101 determines if the previously assigned IP address is still available and if yes the process continues to step 308 where DHCP server 101 determines if there is a free IP address in a subnet which has a higher priority than the current free address subnet. If not, the previously assigned IP address will be reassigned to client 107 and the process continues to step 309 where the DHCP server 101 stores a mapping between the IP address and the client MAC address. The process continues to step 311 where the DHCP server 101 offers the IP address to client 107 via a DHCP Offer message. The process ends at step 313.

If at step 305, the DHCP server 101 determines that the client did not previously have an IP address assigned to it; or if at step 307 the DHCP server 101 determines that the previously assigned IP address is no longer available; or if at step 308 DHCP server 101 determines that there is a free IP address in a subnet which has a higher priority than the current free address subnet; then the process continues to step 315 to select an appropriate IP address. At step 315 the DHCP server 101 determines the IP address pool (104A, 104B, or 104C) associated with the gateway interface address (gi-addr) contained in the DHCP Discover message from the client 107. At step 317 the DHCP server 101 determines the subnets associated with the IP address pool determined at step 315. At step 319 the DHCP server 101 sorts the subnets by the priority of each subnet. At step 321 the DHCP server 101 selects an available IP address from the subnet having the highest priority at which point the process continues to step 309 where the DHCP server 101 stores a mapping between the selected IP address and the client MAC address.

Figure 4:
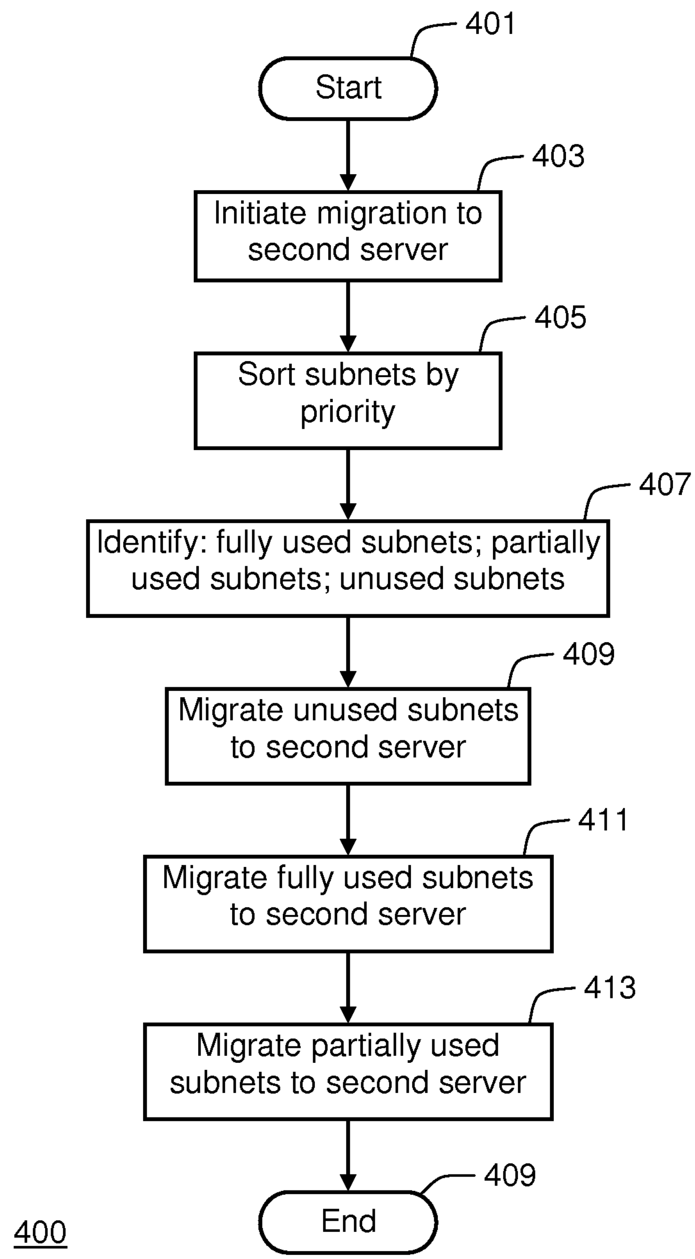
FIG. 4 is a flow chart illustrating migrating from a first DHCP server to a second DHCP server using subnet priority.

Prioritizing subnets within the DHCP server offers advantages especially when migrating from a first DHCP server to a second DHCP server as well as in the context where subnets are migrated from a first IP address pool to a second IP address pool. FIG. 4 is a flow chart illustrating migrating from a first DHCP server to a second DHCP server using subnet priority. The process starts at step 401. At step 403 a migration from a first DHCP sever to a second DHCP server is initiated. At step 405, the first DHCP server sorts the subnets by priority. At step 407, the first DHCP server identifies the prioritized subnets as belonging to one of three groups: fully used subnets having no available IP addresses to assign; partially used subnets having some available IP addresses to assign; unused subnets where all the IP addresses are available to assign. By grouping subnets in this manner, seamless migration is possible, minimizing the potential for IP addresses to be inadvertently allocated by two servers.

At step 409 the first DHCP server first migrates the unused subnets to the second DHCP server. These subnets are now available to the second DHCP server for allocating IP addresses in response to DHCP Discover messages even before the migration process is fully completed. Thus if a request for an IP address arrives at the second DHCP server before the migration is completed, the second DHCP server can assign an IP address from one of the transferred subnets without risk of assigning an IP address that might have been in the process of being assigned by the first DHCP server.

At step 411, the first DHCP server then migrates the fully used subnets to the second DHCP server. There is less urgency to migrate these subnets because these subnets are fully used, there are no available IP addresses to be allocated and the allocated (used) IP addresses have lease timers that will eventually expire. Finally at step 413 the first DHCP server migrates the partially used subnets to the second DHCP server. Until this point, the first DHCP server still has access to the partially used subnets for allocating IP addresses for any requests that might be received during the migration process. Typically there will be only one partially used subnet, as a result of the prioritization of the subnets for the purposes of allocating IP addresses to clients.

Figure 5:
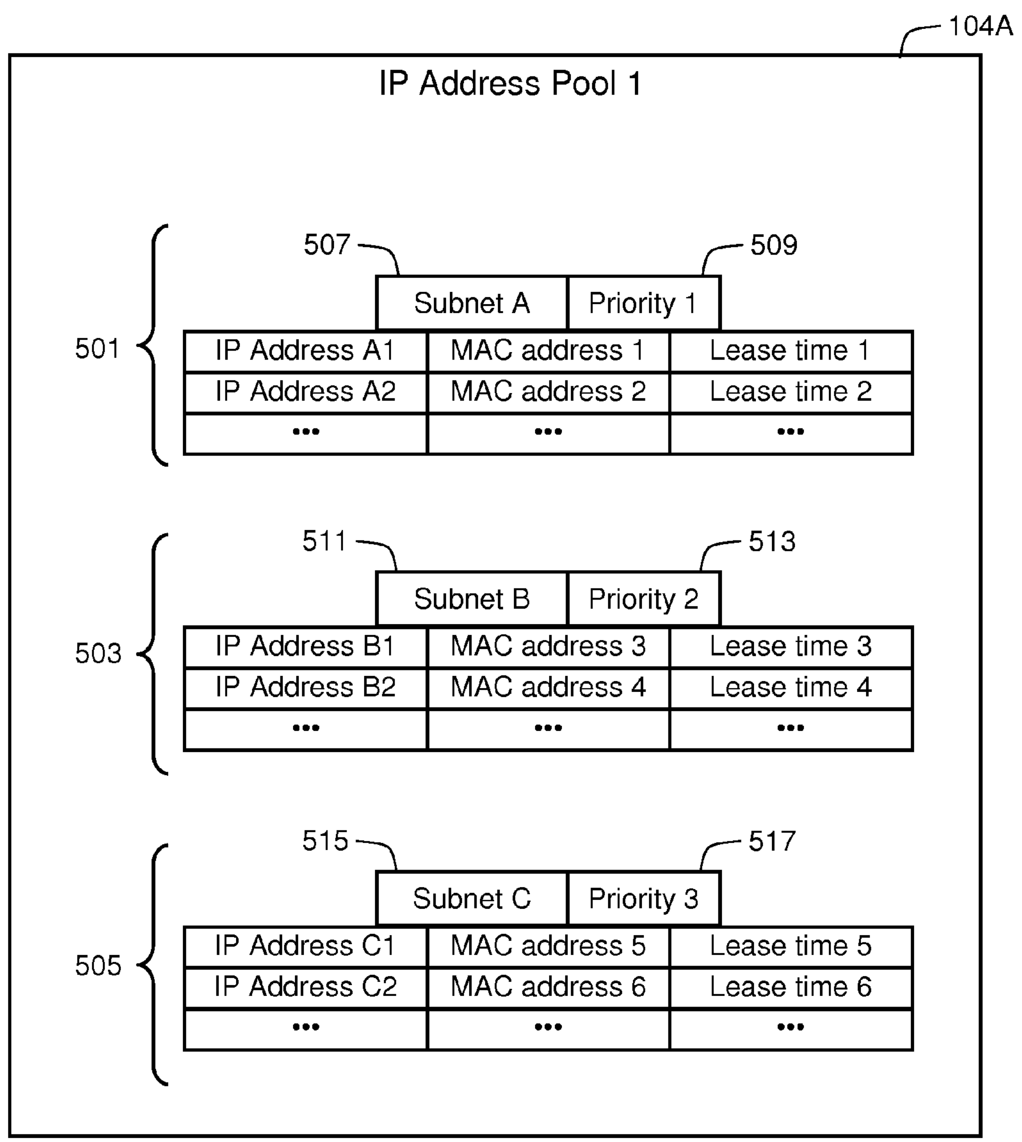
FIG. 5 illustrates a data structure of an IP address pool of a DHCP server.

FIG. 5 illustrates a data structure of an IP address pool 104A of a DHCP server 101. DHCP server 101 can handle multiple IP address pools (104A, 104B, 104C, etc.) for handling IP address requests from clients for different customers. Thus each IP address pool can be dedicated to a specific customer. The IP address pool 104A is structured into data storage 501, 503, 505 for multiple subnets (Subnet A, Subnet B and Subnet C respectively). Data storage 501 has storage 507 for a subnet label ("Subnet A") and storage 509 for an associated priority ("Priority 1"). Subnet storage 501 contains a range of IP addresses (IP address 1, IP address 2, etc.) Each IP address within the subnet has storage for a MAC address (MAC address 1, MAC address 2, etc) if the IP address has been assigned to a client, and an associated lease time (Lease time 1, Lease time 2, etc.) Subnet storage 503, 505 are arranged similarly.

To summarize, various enhancements to DHCP server functionality include specification of a priority for every subnet. This priority controls the order in which the subnet IP Addresses would be exhausted. The DHCP server will allocate IP Address from a subnet based on its priority. An available IP Address from a subnet with the highest priority would be chosen first. After exhaustion from this subnet, the next subnet with a lower priority will be chosen for allocation. This aspect controls the order of IP address exhaustion from various subnets. It provides a deterministic method for assigning IP addresses and gives clear control to determine which subnet is fully utilized and which one is free. In case of IP Address Pool migration from one DHCP server to another, subnet prioritization can be advantageous for the operator by minimizing potential for synchronization issues during handover.

The configuration of priority for each subnet can be performed using a GUI or configuration file which controls the behavior of the DHCP server for allocation of IP Address.

Embodiments of the invention aid in synchronizing a first DHCP server with a second DHCP server in preparation for migrating DHCP service from the first DHCP server to the second DHCP server.

The subnet priority can be advantageous for static IP address assignment as well as dynamic IP address assignment.

In some environments it will be necessary to reassign network addresses due to exhaustion of available addresses. In such environments, the allocation mechanism will reuse addresses whose lease has expired. The DHCP server can use whatever information is available in the configuration information repository (database 103) to choose an address to reuse. For example, the server may choose the least recently assigned address.

It will be appreciated that the functions depicted and described herein may be implemented in hardware, for example using one or more application specific integrated circuits (ASIC), and/or any other hardware equivalents. Alternatively, the functions may be implemented as software loaded into memory and operating on hardware such as at DHCP server node.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

The functions of the various elements shown in the Figures, including any functional blocks labeled as “processors”, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term “processor” or “controller” should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to “one embodiment” or “an embodiment” means that a particular feature, structure, or characteristic described in connection with the embodiment can be included in at least one embodiment of the invention. The appearances of the phrase “in one embodiment” in various places in the specification are not necessarily all referring to the same embodiment, nor are separate or alternative embodiments necessarily mutually exclusive of other embodiments. The same applies to the term “implementation.”

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Numerous modifications, variations and adaptations may be made to the embodiment of the invention described above without departing from the scope of the invention, which is defined in the claims.

What is claimed is:

1. A method for handling Dynamic Host Configuration Protocol (DHCP) at a first DHCP server, said method comprising steps of:

receiving, via a configuration file at the first DHCP server, a priority for each of a plurality of subnets;

assigning the priority to each of the plurality of subnets;

receiving a DHCP Discover message from a client;

in response to receipt of a DHCP Discover message from a client, selecting a subnet having a highest priority from said plurality of subnets;

selecting an Internet Protocol (IP) address from said selected subnet having a highest priority; and transmitting a DHCP Offer message to said client, offering said selected IP address.

2. The method of claim 1, wherein said assigning a priority comprises receiving input from an operator.

3. The method of claim 1, wherein said assigning a priority comprises receiving input from a configuration file.

4. The method of claim 1, further comprising steps of identifying at said first DHCP server, fully used subnets; partially used subnets; and unused subnets;

first migrating unused subnets from said first DHCP server to a second DHCP server;

migrating fully used subnets from said first DHCP server to said second DHCP server; and then migrating partially used subnets from said first DHCP server to said second DHCP server.

5. The method of claim 1, further comprising the steps of:

in response to receipt of a DHCP Discover message from a client, determining a previously used IP address for said client; and determining that IP address is no longer available prior to selecting a subnet.

6. The method of claim 1, further comprising the steps of: determining an IP pool based on an address of the DHCP Discovery message; and determining subnets associated with the IP pool.

7. The method of claim 1, wherein the step of receiving, at the first DHCP server, a priority for each of a plurality of subnets, further comprises: receiving a configuration file.

8. A program storage device readable by a machine, tangibly embodying a program of instructions executable by the machine to perform the steps of:

receiving, via a configuration file at the first DHCP server, a priority for each of a plurality of subnets;

assigning the priority to each of the plurality of subnets;

receiving a DHCP Discover message from a client;

selecting a subnet having a highest priority from said plurality of subnets;

selecting an Internet Protocol (IP) address from said selected subnet having a highest priority; and transmitting a DHCP Offer message to said client, offering said selected IP address.

9. The program storage device of claim 8, further comprising steps of identifying at said first DHCP server, fully used subnets; partially used subnets; and unused subnets;

first migrating unused subnets from said first DHCP server to a second DHCP server;

migrating fully used subnets from said first DHCP server to said second DHCP server; and then migrating partially used subnets from said first DHCP server to said second DHCP server.

10. The program storage device of claim 8, wherein said assigning a priority comprises receiving input from an operator.

11. The program storage device of claim 8, wherein said assigning a priority comprises receiving input from a configuration file.

12. A DHCP server, comprising:

a processor; and a memory communicatively connected to the processor, the memory having stored thereon instructions which, when executed by the processor, cause the processor to:

receive, via a configuration file, at the first DHCP server, a priority for each of a plurality of subnets;

assign the priority to each of the plurality of subnets;

receive a DHCP Discover message from a client;

select a subnet having a highest priority from said plurality of subnets;

select an Internet Protocol (IP) address from said selected subnet having a highest priority; and transmit a DHCP Offer message to said client, offering said selected IP address.

13. The DHCP server of claim 12, wherein said assigning a priority comprises receiving input from an operator.

14. The DHCP server of claim 12, wherein said assigning a priority comprises receiving input from a configuration file.

15. The DHCP server of claim 12, wherein the instructions further cause the processor to identify at said first DHCP server, fully used subnets; partially used subnets; and unused subnets;

first migrate unused subnets from said first DHCP server to a second DHCP server;

migrate fully used subnets from said first DHCP server to said second DHCP server; and then migrate partially used subnets from said first DHCP server to said second DHCP server.

* * * * *